United States Patent
Hansen

[15] 3,680,670
[45] Aug. 1, 1972

[54] CLUTCH-BRAKE MECHANISM AND MOUNTING, AND CONTROL SYSTEM THEREFOR

[72] Inventor: Quinten A. Hansen, Highway 38, Franksville, Wis. 53126

[22] Filed: Dec. 14, 1970

[21] Appl. No.: 97,896

[52] U.S. Cl...................192/18 R, 192/115, 180/6.2
[51] Int. Cl.............................................F16d 67/02
[58] Field of Search.......192/18 R, 18 A, 115, 85 CA

[56] References Cited

UNITED STATES PATENTS

| | | | |
|---|---|---|---|
| 3,202,249 | 8/1965 | Schubert | 192/18 R |
| 3,386,545 | 6/1968 | Hansen | 192/18 R |
| 2,440,304 | 4/1948 | Simmons | 192/18 R |
| 2,701,042 | 2/1955 | Kurzweil | 192/85 CA |

*Primary Examiner*—Benjamin W. Wyche
*Attorney*—James E. Nilles

[57] ABSTRACT

A clutch-brake mechanism in which the brake is disengaged while the clutch is engaged and vice-versa. The mechanism is mounted in such a manner that the common shaft on which the pair of mechanisms is mounted together with an intervening driven sheave is not subjected to bending or twisting regardless of the pivoting of the vehicle frame relative to the mechanisms and driven sheave. A power transmission including a pair of such mechanisms with separate steering and brake control systems, each of which are connected separately to each of the mechanisms.

13 Claims, 3 Drawing Figures

CLUTCH-BRAKE MECHANISM AND MOUNTING, AND CONTROL SYSTEM THEREFOR

BACKGROUND OF THE INVENTION

In power transmissions for all terrain vehicles for example, steering is effected by momentarily applying the brakes to the driving ground engaging members at one side of the vehicle. To accomplish this, clutch-brake units have been provided wherein the driving clutch to the ground wheel on one side is momentarily disengaged while the brake is applied to that particular wheel. Heretofore, these clutch-brake units have been fabricated from numerous parts and have resulted in rather large and bulky devices. Furthermore, they were difficult to assemble, maintain in proper operating order, and repair.

An example of such a prior art device is shown in my U.S. Pat. No. 3,386,545, which issued June 4, 1968 and is entitled "Alternatively Operable Couplings with Intervening Actuator Encircling Thrust Rod in Spline of Hub." In that device however, many complex and expensive parts were necessary, and the device was comparatively large, particularly in an axial direction, and the instant invention departs from that patented device and provides a distinctly different principle of operation.

SUMMARY OF THE INVENTION

The present invention provides a clutch-brake mechanism in which the pack of brake discs is located between two non-rotatable bearing members, and an actuator for the clutches also constitutes a back up plate for the brake. The multiple disc clutch-brake mechanism utilizes drive pins for assembling the plates and which are located outside the diameter of the fraction engaging surfaces to thereby provide good area between the pins for good cooling; the drive pins are furthermore located around the circumference to provide rugged and good driving.

Another aspect of the invention relates to the means for mounting the clutch-brake mechanisms on a common axis with an intervening driven sheave whereby the common axis of the mechanisms and sheave will not twist or bend regardless of the play or relative movement between the vehicle frame and other parts of the device. More specifically, the mechanisms are pivotally mounted at their opposed sides so as to maintain the alignment on their common axis and at the same time provide flexibility between the vehicle frame and other parts.

These and other objects and advantages of the present invention will appear hereinafter as this disclosure progresses, reference being had to the accompanying drawings.

DESCRIPTION OF A PREFERRED EMBODIMENT

Figure 1:
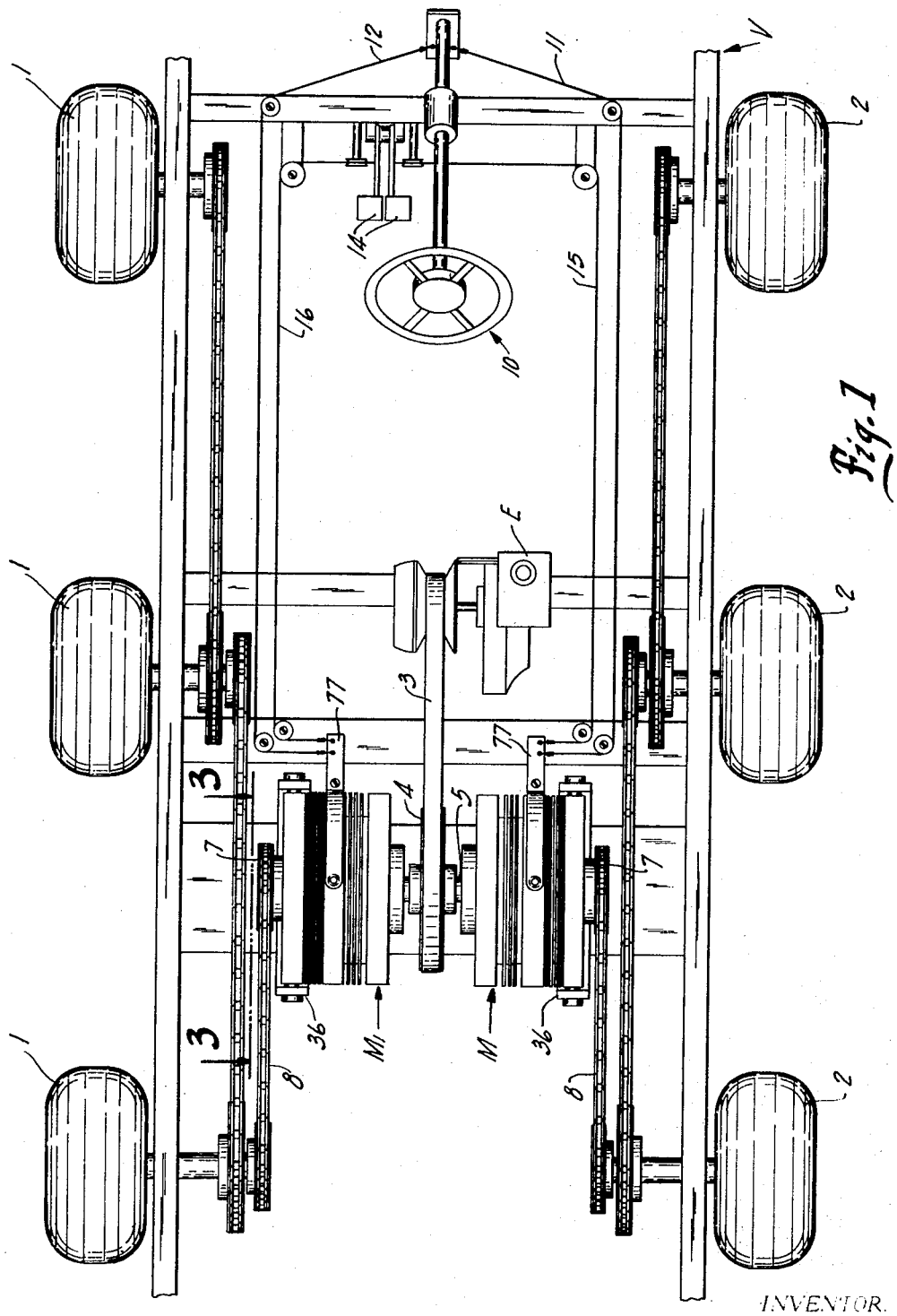
FIG. 1 is a general, more or less schematic diagram showing an all terrain vehicle including the steering and brake control system for a power transmission including a pair of clutchbrake mechanisms.
Figure 2:
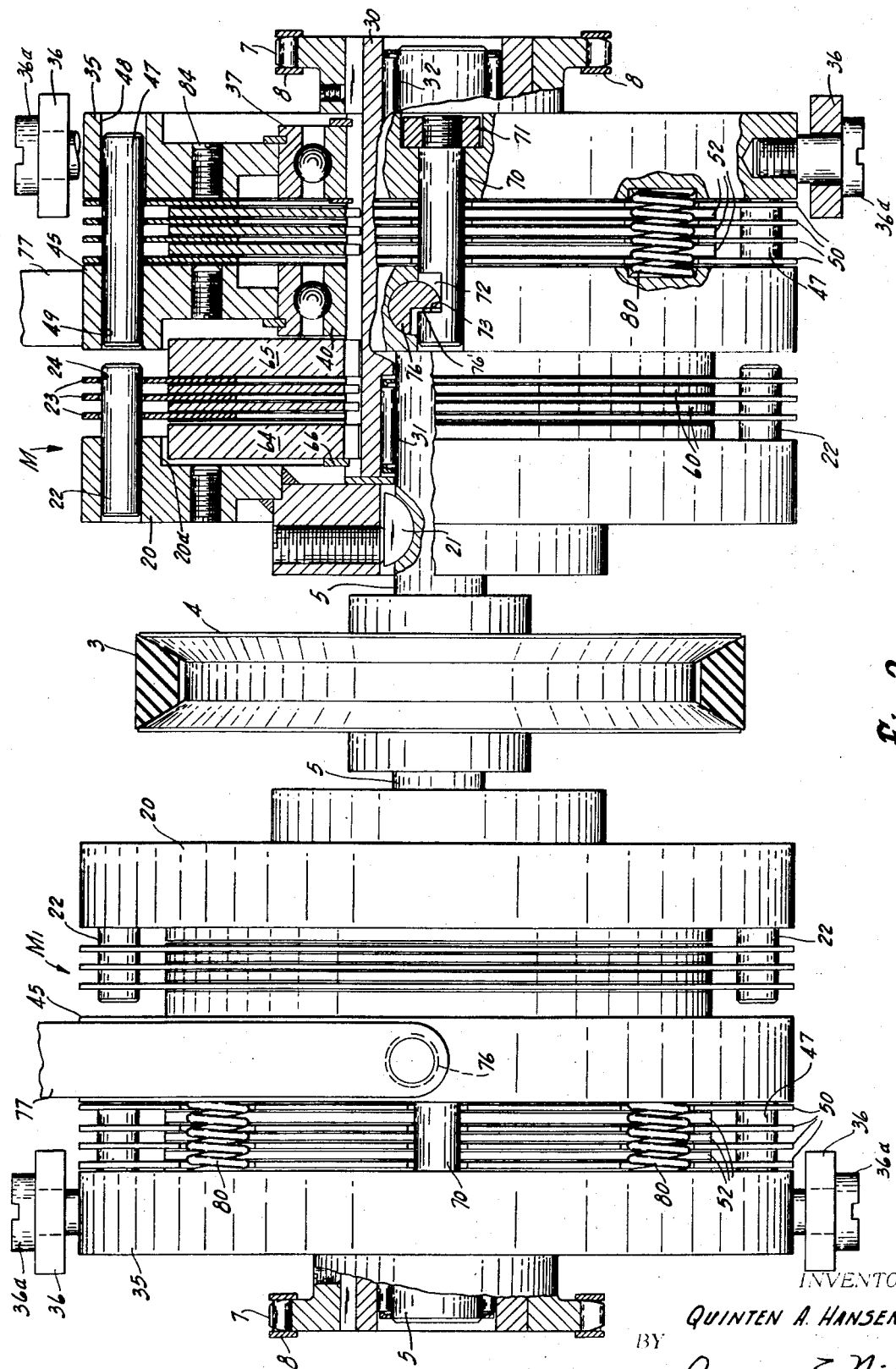
FIG. 2 is a longitudinal, partial cross sectional view through the transmission shown in FIG. 1.
Figure 3:
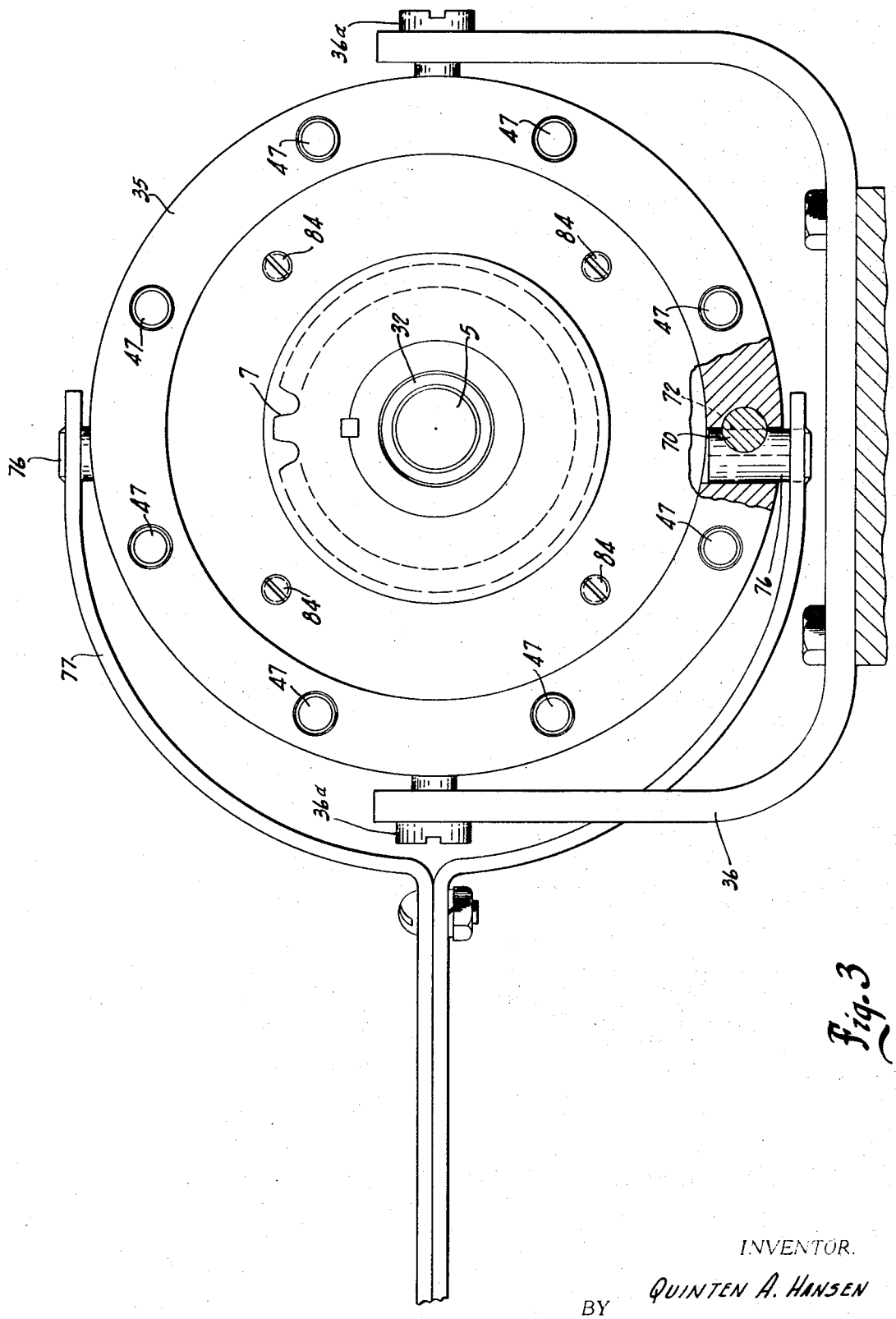
FIG. 3 is a transverse, end elevational view of one of the mechanisms, the view being taken generally from the right end in FIG. 2, with certain parts being shown as broken away for clarity.

Referring to the general arrangement as shown in FIG. 1, a vehicle V is provided with ground engaging members, such as wheels 1 and 2 located at opposite sides of the vehicle. In all terrain vehicles of the character with which this invention finds particular utility, steering is effected by momentarily disengaging the clutch and applying the brake to the wheels at one side of the vehicle while the opposite ground engaging wheels continue to be driven. When it is desired to slow or stop the vehicle the mechanisms can be simultaneously shifted to neutral or the brakes of both mechanisms applied simultaneously.

The vehicle includes an internal combustion engine E which provides power via the endless belt 3 to a large sheave 4 that is fixed to the main drive shaft 5. A pair of clutch-brake mechanisms M and M1 are provided, one on each side of the main sheave 4, and these mechanisms can provide driving power from the shaft 5 to their output sprocket 7.

The output sprockets 7 are connected to their respective ground wheels by means of the endless chains 8, or the like. A steering wheel apparatus 10 is provided for the operator and connections in the form of cables 11 and 12 are connected between the steering wheel apparatus and the respective clutch-brake mechanisms M and M1, respectively. When the apparatus 10 is turned in one direction, one of the mechanisms is actuated to cause its normally engaged clutch to be disengaged and its brake to be engaged. The other mechanism is unaffected and its clutch continues to drive its ground wheel.

The operator also has under his control a brake pedal 14 which has connections, such as cables 15 and 16, respectively, with the clutch brake mechanisms M and M1. Depression of the brake pedal 14 causes simultaneous pulling on the cables 15 and 16 and consequently simultaneous actuation of the brakes B of the units M and M1, thereby causing the ground engaging wheels of the vehicle to stop.

The steering apparatus and the brake control are both connected to the same operating lever of their respective mechanisms to thereby operate the same brake of the mechanism to both steer and perform the brake function.

When the operator of the vehicle desires to turn in one direction or another, he simply turns the steering wheel 10 in the appropriate direction. This turning movement causes one of the cables to be pulled tightly thereby engaging the brake and disengaging the clutch of that particular mechanism. The other cable is simply permitted to be slack thereby not effecting the other clutch-brake mechanism. Thus, turning movement of the vehicle is accomplished by actuating the brake and releasing the clutch on one side of the vehicle or the other.

In order to stop the unit, the brakes B of both of the mechanisms must be simultaneously applied and their clutches simultaneously released. To accomplish this, the brake pedal 14 is depressed which causes both of the cables 15 and 16 to be pulled tightly. The cables 15 and 16 are also connected to the operating handle 77 of their respective clutch brake mechanisms, thereby causing engagement of both of the brakes and release of both of the clutches. In this manner, the brakes of the mechanisms are used both for the steering function and for the braking function.

The clutch-brake mechanisms will now be described in detail and it should be understood that these mechanisms are similar and therefore, detailed reference to only one is deemed to be necessary.

The clutch-brake mechanism includes input power shaft 5 to which an input clutch member 20 is fixed by means of a key 21. A series of drive pins 22 are circumferentially spaced around the member 20 and have free ends extending therefrom. A series of clutch plates 23 are mounted on the pins by means of their apertures 24.

An elongated hub 30 is journalled for rotation on the shaft 5 by means of the pairs of anti-friction needle bearing assemblies 31 and 32. An output sprocket 7 is splined to the shaft for rotation therewith and for delivering power from the clutch-brake mechanism.

A stationary brake member 35 is mounted to a frame member 36 of the vehicle and has an anti-friction ball bearing assembly 37 mounted centrally therein. This bearing assembly 37 also rotatably journals the hub. Another anti-friction ball bearing assembly 40 is mounted on the hub at a distance spaced axially from assembly 37 and an axially shiftable member 45 is mounted on the anti-friction bearing assembly 40. The bearing assembly 40 and the member 45 constitute an actuator which can be axially shifted along the hub.

A series of circumferentially spaced drive pins 47 extend through aligned apertures 48 and 49 in members 35 and 45, respectively and a series of friction plates 50 are also mounted by their apertures on the circumferentially spaced pins 47. Another set of friction plates 52 are connected by their splines to the exteriorly splined hub, and plates 50 and 52 are interleaved in the known manner whereby together with members 45 and 35, they form a releasable brake.

Other friction plates 60 are splined to the exterior of hub 30 and are interleaved with plates 23. A pair of plates 64 and 65 are also splined to the hub and a stop ring 66 limits the axial movement in one direction. Thus, the plates 23, 60, 64 and 65, act to form a releasable clutch.

The means then selectively causes disengagement of the clutch and engagement of the brake as follows.

Axially extending link means in the form of a pair of diametrically opposed actuator pins 70 are threadably secured to the stationary brake member 45 and adjustably held thereon by an adjusting nut 71. The other end of the pins have a slot 72 formed therein and formed partially by a radially extending shoulder 73. An oscillatable lever means in the form of pin 76 having a shoulder 76' is arranged transversely in the mechanism and extends through the shiftable member 45 and has an actuating handle 77 attached to it, as by welding. Oscillation of the handle 77 causes corresponding oscillation of the lever means 76 and consequent engagement of shoulders 76' and 73 to cause axial shifting movement of the actuator, the thrust being taken by the stationary link means 70. Thus, the actuator can be shifted in axial directions to either cause clamp up of the brake interleaved plates and disengagement of the clutch plates.

A plurality of circumferentially spaced coil springs 80 acting between plates 35 and 45, act to urge the mechanism into the clutch engaged and brake released position, and this is the normal operating mode of the mechanism.

However, when it is desired to engage the brake and disengage the clutch, the handle 77 is swung against the bias of the coil spring 80 to thereby cause clutch release and brake engagement.

In this arrangement the brake plate pack is located between its non-rotatable bearing members that are held stationarily fixed to the frame member.

In place of the coil springs 80 which serve to disengage the brake and hold the clutch normally engaged, a plurality of Belleville springs (not shown) located between the brake plates could be used.

When the handle 77 is actuated to shift the actuator to the brake clamping position, bearing member 40 no longer bears against clutch plate 65, thereby permitting the clutch to be released. However, when the handle 77 is released, the spring means 80 urge the brake to the disengaged position and causes the actuator to shift in an axial direction, thereby engaging the clutch plates.

A plurality of set screws 84 are located in plate 35 and are used to adjust the clearance between the plates as desired. In this manner, the neutral position can be varied, that is to say, the position in which the handle 77 is actuated only enough to cause disengagement of the clutch plates but not sufficiently to cause brake plate clamp-up.

The clearance between the clutch plates in the released position can also be adjusted by means of the nuts 71 on the link means 70.

The plates 20, 35 and 45 can all be of identical construction. It is noted that plate 20 has a recess 20a therein which permits axial nesting of the clutch plate 64 therein.

Referring again to the frame member 36 for mounting the clutch-brake mechanisms, it will be noted that one such frame 36 is provided for each mechanism and is of generally U-shaped construction. The frame 36 has a pair of inwardly disposed and spaced apart pivot stub shafts formed by bolt 36a which extend into diametrically opposed apertures located in the periphery of stationary member 35. Thus, the mechanisms can pivot within limits in their respective frames 36. As a result, the common axis that passes through both mechanisms and also through the intervening driven sheave does not twist or flex even though the vehicle frame may distort and bend when in use. This flexing of the vehicle frame and the maintaining of the common axis through the mechanisms and sheave in a straight line does not affect the drive connection, such as the endless chains 8 and the endless belt 3, because there is sufficient flexibility in these driving members in the event there is any twisting or bending of the frame relative to the common axis of the vehicle.

RESUME

The mechanism provided by the present invention uses the centrally located actuator as a back-up plate for the brake plates and also as a clamping member for the clutch plates.

The mechanism of the present invention is in the nature of a heavy duty clutch-brake mechanism in which multiple discs are utilized as their friction engaging members. The coil springs utilized to hold the brake is disengaged position are relatively inexpensive and one set of such coil springs is useable regardless of the number of discs in the brake mechanism.

The arrangement of the present invention provides a device which is readily cooled because the drive pins are located outside the discs of the friction engaging surfaces and consequently the area between the pins can adequately cool the device. These pins are of hardened steel and are press fit into their adjacent plates and provide positive and uniform drive all around the circumference of the mechanism.

With the steering control system and the brake control system each separately connected to each of the mechanisms, it is possible for the operator to steer the vehicle with these brakes by selectively applying them, and it is also possible for the operator to slow or stop the vehicle by simultaneously partially engaging or completely engaging both brakes. Thus, there is no necessity for a separate brake for each the steering and braking functions.

The means for mounting the clutch-brake mechanisms on a common axis with a driven sheave therebetween insures that the common shaft will not twist or bend even though the vehicle frame itself may distort. This mounting means includes pivot means at opposite sides of both mechanisms so as to permit them to pivot slightly thereby insuring that the common shaft does not twist. Even though the mechanism pivots slightly and the common shaft can shift bodily as a unit without flexing, the flexible connections, such as the chains 8 and the V-belt 3, can accommodate any relative shifting movement between these parts and the vehicle frame.

I claim

1. A clutch-brake mechanism comprising, an engageable brake including a stationary brake member, an input power shaft, an elongated hub rotatably mounted on said power shaft and also journalled for rotation in said stationary brake member; a disengageable clutch including an input clutch member fixed to said shaft for rotation therewith, and interleaved clutch plates between said input clutch member and said hub to form a releasable clutch therewith; interleaved brake friction plates connected between said stationary brake member and said hub and forming a releasable brake therewith, and an axially shiftable actuator mounted on said hub and located axially between said clutch plates and said brake friction plates, said actuator having a connection with said stationary brake member which prevents relative rotation therebetween, actuating means including an axially extending link means mounted on said brake member and also connected with a lever means, which lever means is pivoted to said actuator, said lever means when pivoted being operable for axially shifting said actuator to cause engagement of said brake by causing clamp up of said brake friction plates located between said actuator and said stationary brake member and also simultaneously causing disengagement of said clutch, and spring means acting to axially shift said actuator to a brake disengaged and clutch engaged position.

2. The mechanism set forth in claim 1 further characterized in that said axially shiftable actuator comprises an anti-friction ball bearing assembly axially slideable on said hub and a plate mounted on said bearing assembly for sliding therewith.

3. The mechanism set forth in claim 1 further characterized in that said stationary brake member has an axially fixed anti-friction ball bearing assembly mounted centrally therein and said elongated hub is journalled in said axially fixed anti-friction ball bearing assembly.

4. The mechanism set forth in claim 1 including operating handle extending radially outward from said actuator for swinging movement in respect thereto.

5. The mechanism set forth in claim 1 including a pair of clamping plates splined to said hub, one on each side of said interleaved clutch plates and said actuator is abuttable against one of said clamping plates to cause said clutch plates to be clamped between said clamping plates.

6. The mechanism set forth in claim 1 further characterized in that said connection between said actuator and said stationary brake member comprises a series of drive pins extending through aligned apertures in said actuator and said stationary brake member which prevent relative rotation therebetween but permit limited axial movement of said actuator.

7. The mechanism set forth in claim 1 including mounting means for pivotally mounting said mechanism, said mounting means comprising, a frame member, and transverse pivot means between said frame member and diametrically opposite sides of said stationary brake member, whereby said mechanism can pivot slightly about a transverse axis and relative to said frame member.

8. A clutch-brake mechanism comprising, a disengageable brake including a stationary brake member including an anti-friction ball bearing assembly mounted centrally therein, an input power shaft, an elongated hub rotatably mounted on said power shaft and also journalled for rotation in said anti-friction ball bearing assembly of said stationary brake member; a disengageable clutch including an input clutch member fixed to said shaft for rotation therewith, and interleaved clutch plates between said input clutch member and said hub to form a releasable clutch therewith; a pair of clamping plates splined to said hub, one on each side of said interleaved clutch plates, interleaved brake friction plates connected between said stationary brake member and said hub and forming a releasable brake therewith, and an axially shiftable actuator mounted on said hub and located axially between said clutch plates and said brake friction plates, said axially shiftable actuator comprising an anti-friction ball bearing assembly axially slideable on said hub and a plate mounted on said bearing assembly for sliding therewith, said actuator having a connection with said stationary brake member which prevents relative rotation therebetween, actuating means including an axially extending link means mounted on said brake member and also connected with a lever means, which lever means is pivoted to said actuator, said lever means when pivoted being operable for axially shifting said actuator to cause abutment with one of said clamping plates to cause clamp up of said brake friction plates located between said actuator and said stationary brake member and also simultaneously causing disengagement of said clutch, and spring means for urging said actuator to a brake disengaged and clutch engaged position.

9. The mechanism set forth in claim 8 including mounting means for pivotally mounting said mechanism, said mounting means comprising, a frame member, and transverse pivot means between said frame member and diametrically opposite sides of said stationary brake member, whereby said mechanism can pivot slightly about a transverse axis and relative to said frame member.

10. The mechanism set forth in claim 8 further characterized in that said connection between said actuator and said stationary brake member comprises a series of drive pins extending through aligned apertures in said actuator and said stationary brake member which prevent relative rotation therebetween but permit limited axial movement of said actuator.

11. The mechanism set forth in claim 8 including operating handle extending radially outward from said actuator for swinging movement in respect thereto.

12. The mechanism set forth in claim 10 including mounting means for pivotally mounting said mechanism, said mounting means comprising, a frame member, and transverse pivot means between said frame member and diametrically opposite sides of said stationary brake member, whereby said mechanism can pivot slightly about a transverse axis and relative to said frame member.

13. A clutch-brake mechanism comprising, an engageable brake including a stationary brake member, an input power shaft, an elongated hub rotatably mounted on said power shaft and also journalled for rotation in said stationary brake member; a disengageable clutch including an input clutch member fixed to said shaft for rotation therewith, and interleaved clutch plates between said input clutch member and said hub to form a releaseable clutch therewith; interleaved brake friction plates connected between said stationary brake member and said hub and forming a releaseable brake therewith, and an axially shiftable actuator mounted on said hub and located axially between said clutch plates and said brake friction plates, said actuator having a connection with said stationary brake member which prevents relative rotation therebetween but permits relative axial movement therebetween, actuating means including an axially extending link means mounted on said brake member and also connected with a lever means, which lever means is pivoted to said actuator, said lever means when pivoted being operable for axially shifting said actuator to actuate said clutch, and spring means acting to axially shift said actuator.

* * * * *